Oct. 22, 1968 N. A. TERNES 3,406,626

CONTINUOUS CONTROL REGISTER

Filed May 23, 1966 2 Sheets-Sheet 1

INVENTOR

NORMAN A. TERNES

BY Robert M. Dunning

ATTORNEY

Oct. 22, 1968 N. A. TERNES 3,406,626

CONTINUOUS CONTROL REGISTER

Filed May 23, 1966 2 Sheets-Sheet 2

INVENTOR
NORMAN A. TERNES

BY Robert M. Dunning
ATTORNEY

United States Patent Office 3,406,626
Patented Oct. 22, 1968

3,406,626

CONTINUOUS CONTROL REGISTER

Norman A. Ternes, 387 Minnesota Ave., St. Paul, Minn. 55117

Filed May 23, 1966, Ser. No. 552,253
2 Claims. (Cl. 101—211)

ABSTRACT OF THE DISCLOSURE

The specification discloses a method of producing color plates which may be removed from a press and replaced with virtually no adjustment of registry. The invention involves the use of a stripper table, an exposure table, and a press, each of which is provided with positioning pins spaced apart a distance which is a multiple of three and three-quarters inches. The art work is punched to provide a pair of apertures near one edge spaced apart a distance equal to the spacing of the pins on the press. Color negatives are formed from the art work. A masking sheet is cut to expose the areas of the art work on one color. Negatives are secured to the masking sheet spanning the openings in the masking sheet while the masking sheet overlies the art work on the stripper pins. Similar masking sheets are provided for supporting the negatives of each color. Each masking sheet in turn is placed on the pins of the exposure table. A light sensitive plate for each color is notched along an edge to embrace the pins of the exposure table. Each plate is exposed through a corresponding masking sheet while in registry with the exposure table pins. The plates are then secured, one at a time, to the printing cylinder in registry with the pins and the colors are printed.

This invention relates to an improvement in continuous control register systems and deals particularly with a method and apparatus for applying printing plates to printing presses.

Printing operations which use thin flexible printing plates on the presses oftentimes require considerable make-ready time to prepare the press for its operation. This is particularly true where the printing operation is in several colors. The plates on presses for a multicolor job must be very accurately positioned so all of the various colors register. In many instances, hours of time are required for the make-ready operation. While means are provided for adjusting the position of the plates relative to the printing cylinder, oftentimes hours of preparation are required to print a second color. This difficulty is accentuated if the subsequent color plate is slightly tilted relative to the previous plate.

Where thousands upon thousands of printed sheets are to be made, the make-ready time can be absorbed in the cost of the operation. However, where a relatively few number of sheets are to be printed, the time required for setting up the plates may greatly exceed the actual time of running the press. In many instances, the same plates are used time and again for printing duplicate copies of the same material. Each time a job such as this is to be run, it is necessary for a press operator to again align the plates and get them in proper position.

I have found a way of materially reducing the make-ready time for multicolored printing operations. By following this system, the plates may be applied to the press and the job may be done with little or no time required to adjust the plates. In a typical operation, the plate for a first color was removed, the plate for the second color applied to the cylinder, and a sheet run through the press to determine that the second color was in proper registry within a period of ten minutes. Furthermore, each time the plate is removed from the press and reapplied thereto, it is automatically in the proper position for printing, thereby reducing the make-ready time of the press to a small fraction of its previously required time.

An object of the present invention resides in the provision of a process of the type described in which the original copy is always maintained in a fixed relation relative to the photographic plates, as well as to the actual printing plates. From the start of the method to the end, the elements are maintained in proper registry by the use of fixed pins on each piece of equipment which is employed. The original art work may include a finished layout for each color, or otherwise the layout may be on a single sheet, with transparent overlay indicating which colors are to be on each of the plates.

A mask is produced displaying the photographic transparencies which leaves exposed the areas of the art work which are to be in a single color and masks the remaining area. The original art work may be punched to provide two spaced apertures at a predetermined distance from the edge of the art work, and the art work may be held in position by similarly spaced pins on the edge of the stripping table during the preparation of the masks. In the event the art work appearing on the color plate is quite close together, it is possible to prepare two masks, each of which exposes a predetermined part of the art work of a single color and both the mask plates exposed on the same printing plate in what is described as double "burning operation."

Before exposing the transparencies on the mask to the sensitized printing plate surface, the mask is punched with the apertures preferably on fifteen inch centers. The masks are held in proper relation preferably to the original art work by the pins on the stripping table, or by securing the art work to the stripping table while the various color masks are made.

The actual printing plates are then produced. Thin metal film having a light sensitive surface is exposed to the light through the photograph which forms each separate color. In order to properly locate the plates relative to the film, the edges of the metal plates are notched very accurately on centers which are also preferably fifteen inches apart. If the metal plates were apertured, it would be difficult to apply the plate to the press due to the arrangement of clamps which hold the plates in place on the printing cylinders. Accordingly, the plates are provided with semicircular notches which are located in exact registry with the apertures of the film, and the printing plates are held against the same set of pins on the vacuum or exposure frame bearing the exposure of the plates.

As a result of the previous steps of the process, we have produced a series of color plates, each of which is notched along one edge, and each of which is in exact registry with the other insofar as the position of the notches is concerned. In order to complete the operation, the printing cylinder of the printing press is provided with a pair of radially extending pins which are spaced apart a distance of exactly fifteen inches, and both of which are on the same plane including the axis of the cylinder. These pins are normally located adjacent to the clamps which hold the leading edge of the plate in position. Accordingly, in securing each plate to the printing cylinder, it is only necessary to place the notches in the plate against the pins before clamping the plate in position. As a result of this operation, once the plates have been clamped in place, each plate is in a predetermined position on the cylinder. Furthermore, as the plates of each of the colors have been similarly notched, one color plate may be substituted for the next, and the two colors will be almost invariantly in virtually perfect registry. Furthermore, any plate may be promptly moved and substituted for another color plate of the same job with virtually no adjustment of the plate relative to the cylinder once it has been clamped in place.

In the drawings forming a part of the specification;

The following description is given as being typical of a type of system which can be used to simplify the registration of the printing type plates on printing presses. In view of the fact that the equipment which is available for accomplishing this work varies quite considerably in this measure, and in view of the fact that there are various processes for producing the proper results, the process which has been described is merely typical of one such process, and it should be understood that the process may be varied to suit the occasion. The main consideration in the entire method is to provide a means of insuring the proper registration of the various elements which are used in the method, and in providing a means of producing registering notches in the edge of a printing plate which are exactly located relative to the art work. As a result, the plates are similarly oriented when positioned upon the printing cylinder and require little or no adjustment for the purpose of making them register.

Figure 1:
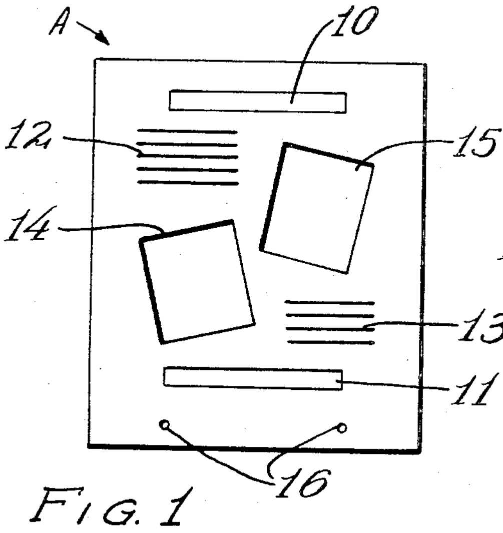
FIGURE 1 is a diagrammatic plan view of a shape of finished art work, showing parts thereon which are to be fitted and taken apart.

In carrying out the process, FIGURE 1 illustrates a sheet A which comprises the original art work. This original art work is diagrammatically illustrated as having a pair of areas 10 and 11 which are to be printed in a first color, a pair of areas 12 and 13 which are designed to be printed in a second color, and a pair of areas 14 and 15 which are designed to be printed in a third color. Obviously, there can be three sets of original art work, each of which bears only the areas which are to be printed in one color, but the single sheet has been shown for the purpose of illustration. The art work is punched to add apertures 16 which are spaced apart a distance which is a multiple of three and three quarters inches and at a predetermined distance from an edge thereof.

From the original art work, a photographer makes a series of photographic negatives. In the present discussion, it is considered that the process starts with "Camera Ready" art. When photographed, the result is a series of individual negatives showing each part of the finished art. Usually some part of the art work is covered with a screen before photographing to produce a half-tone effect.

The first step is to assemble the various negatives on to a single mask for each color. The mask comprises a sheet of flexible paper or the like, which is opaque. The negatives of each color are marginally secured to the mask, and the areas of the negatives which are to appear on a predetermined color plate, are all assembled in proper relation on this mask. The art work A is placed on the pins of the stripper table which will be described. In some instances, where the art work is too close together, two masks are prepared, each bearing a part of the film negatives, and each of the finished masks with the negatives supported thereby is exposed on the same plate by a double burning process. In other words, in such a case the plate is exposed twice rather than a single time.

Figure 5:
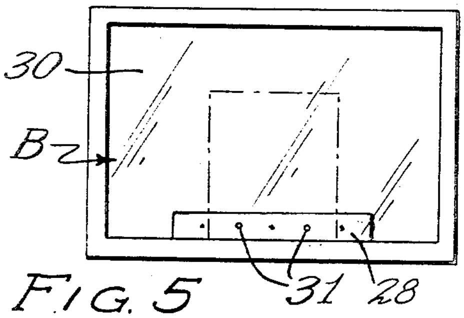
FIGURE 5 is a diagrammatic plan view of a stripping table view in a separation of the mask.

During the formation of the masks, the masks are properly related to the art work by means of pins supported along the edge of the stripping table, the masks overlying the art work. Thus, the parts of the art work which are to be printed are properly located on the mask while the mask is held in position by means of the pins. In other words, in forming each mask, the negatives are attached to the mask after the mask has been punched and mounted upon the reference pins so that each of the masks is in proper relation to the next. The stripping table is diagrammatically illustrated at B in FIGURE 5 of the drawings and comprises a large flat table with the translucent top panel which is illuminated from the under surface. This table, as well as the reference pins thereupon, will be described.

Figure 2:
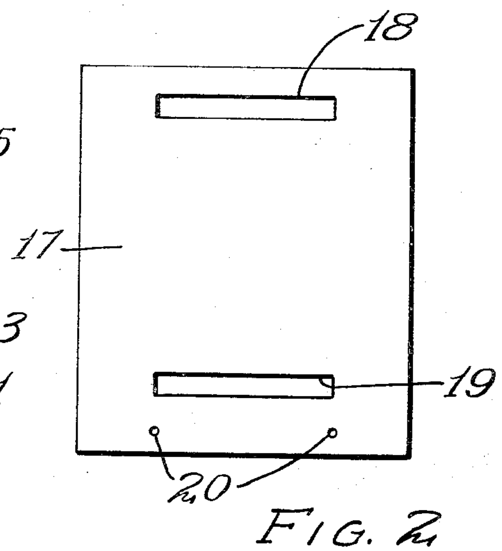
FIGURE 2 shows an art work of FIGURE 1 having a mask overlaying a surface thereof to expose only the areas of the art work which are to be finished in a certain color.

FIGURE 2 of the drawings diagrammatically illustrates a first mask 17 which is designed for use in exposing a pair of negatives which correspond with the art work areas 10 and 11 of FIGURE 1. As is indicated, the area of the masking sheet which corresponds to the art work 10 and 11 is cut to provide apertures 18 and 19. FIGURE 2 also illustrates a pair of reference apertures 20 which are punched in a masking sheet 17 prior to the positioning of the negatives showing the areas 10 and 11, and prior to forming the apertures 18 and 19 to insure the proper location of the negatives relative to the apertures 20.

Figure 3:
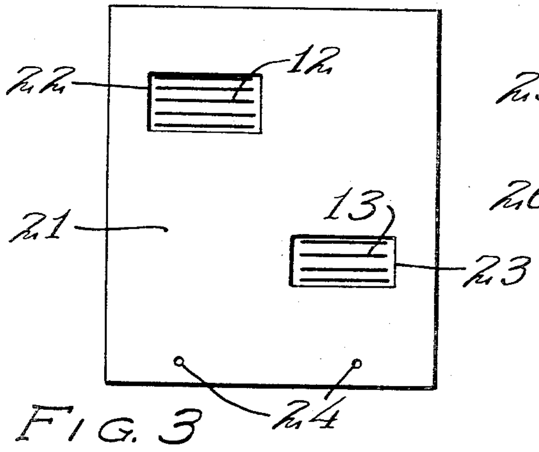
FIGURE 3 is a view similar to FIGURE 2 showing a mask indicating a part of the art work which is to be printed in a second color.

FIGURE 3 of the drawings discloses a second masking sheet 21 which is used to support the negatives corresponding to the art work 12 and 13. The negatives are marginally secured to the masking sheet in perfect alignment with the art work, and the apertures 22 and 23 expose only that area of the original art work which is to be printed in the second color.

Figure 4:
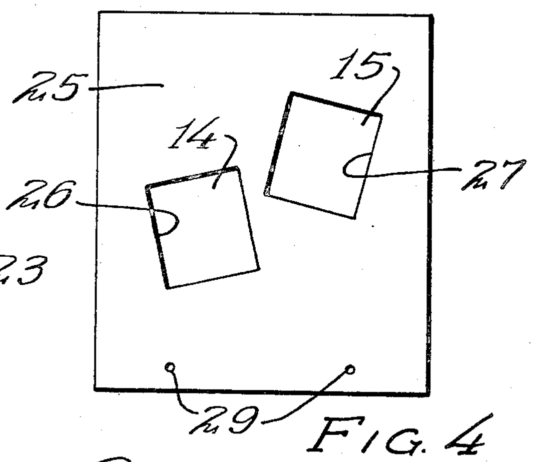
FIGURE 4 is a view similar to FIGURES 2 and 3 but showing the mask to expose the portion of the art work which is to be printed in a third color.

In the same manner, FIGURE 4 illustrates a masking sheet 25 which is provided with a pair of apertures 26 and 27 which expose the negatives corresponding to the art work areas 14 and 15. The negatives are secured to the masking sheet while the negatives are in perfect alignment with the original art work, insuring the proper relationship of the negatives to the negatives on the other two masks. The mask 21 is punched as indicated at 24 and the mask 25 is punched as indicated at 29 so that to insure the proper relationship of the negative to the apertures.

In view of the fact that all of the elements which have been described have been punched in perfect relationship to an edge of the sheet, and all of the work has been done while the parts are supported by suitably spaced pins, all of the masks are in proper relation. The stripping table B is shown as having a glass flat upper surface which is illuminated from below so that the various parts may be visually aligned. A pair of pins 31 are positioned near an edge of the stripper table, and these pins are spaced apart a distance which is exactly equal to the spacing between the various apertures 16, 20, 24 and 29. The pins 31 are normally detachably secured in an elongated metal strip 28 having threaded apertures spaced three and three-quarters inches apart to accommodate the properly spaced pins. The strip 28 is anchored in any desired manner.

Figure 6:
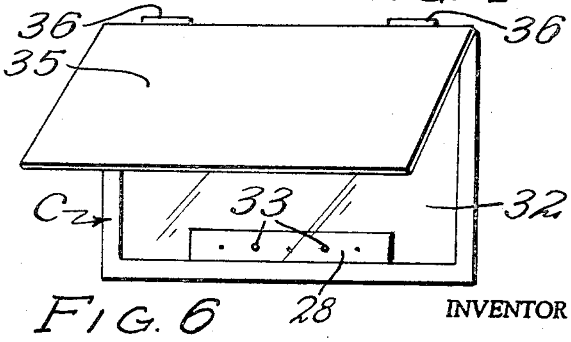
FIGURE 6 is a diagrammatic plan view of a vacuum frame in which the plates are exposed.

The printing plates themselves can now be prepared. This may be done in any one of several ways, as by the vacuum frame C which is indicated diagrammatically in FIGURE 6 of the drawings. The vacuum frame C may include a light source which is used to expose the light sensitive surface of the plate and is provided with a transparent or translucent top panel 32 which is also provided along one edge with a pair of reference pins 33 on a strip 28, which pins are spaced apart a distance exactly equal to the spacing of the various punched holes in the mask. A cover 35 is hinged to one edge of the vacuum frame as indicated at 36, and the masks are held against the plate by a vacuum which insures perfect contact throughout the entire area.

Figures 7, 8, 9:
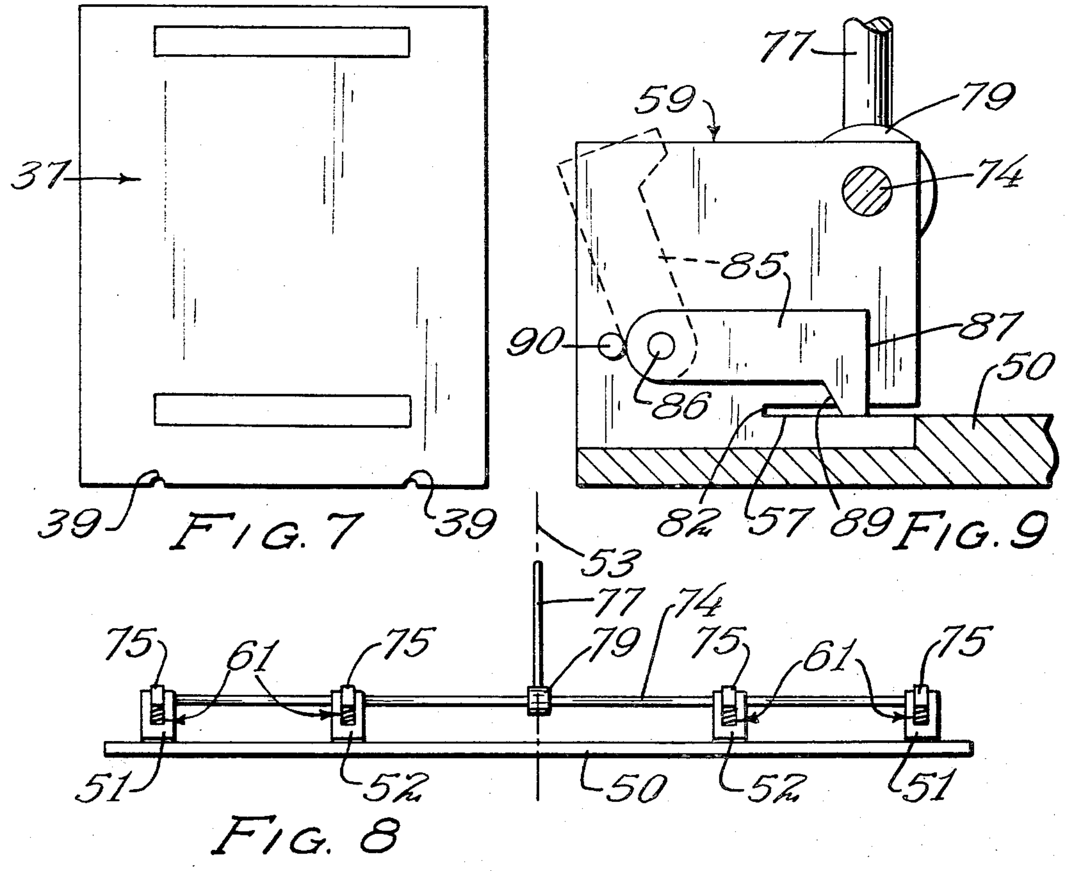
FIGURE 7 is a plan view of one of the early plates designed to print in a predetermined color.
FIGURE 8 is an elevational view of a punch which is used to accurately punch the various elements.
FIGURE 9 is a side elevational view of a portion of the picture elevated in FIGURE 8.

In forming the metal plates, one of which is indicated at 37 in FIGURE 7 of the drawings, an edge of each of the plates is notched as indicated at 39. The printing plates could be apertured similarly to the other various elements of the method, but considerable difficulty would be experienced in attaching the plates to the printing cylinder under such circumstances. The notches 39 are located in the edge of the plates just as accurately as the various other apertures are punched, and are actually formed by the same punching dies as will be later described more in detail. In the formation of the exposed plates 37, each plate is held with the notches 39 engaging against the pins 33 of the masking frame C, and with the apertures of the corresponding mask encircling the same pin. The plate is then exposed through the apertures in the mask, and the color plate is formed corresponding to a first color.

The same operation is repeated using a second color plate which is notched and in which the notches are carefully positioned against the pins 33 while the apertures of the second mask encircle these pins. The third color plate is formed in the same manner. When this is done, it would be seen that the three plates are provided with notched edges which are properly related to the representation of the art work on that plate. This is possible because the various elements used in the process have been kept in proper relationship through the process. It should be noted that the apertures 16, 20, 24, 29, and the notches 39 are all of the same radius, and have a close and accurate fit with the pins 31 and 33. As will be noted, all of the apertures are preferably formed by the same punching device. The pins 43 on the printing cylinder also closely and accurately fit notches 39 of the printing plates.

In view of the fact that printing presses which are capable of using flexible plates of the type in question, are made in various forms and differ materially in structure, I have made no attempt to accurately disclose the printing cylinder. However, in the formation of the cylinder, or in adapting a printing press to use the present process, a pair of holes are drilled in the cut-away portion 40 of the cylinder D which includes the clamps 41 which are engageable with the leading edge of the plate, and clamps 42 which are engageable with the trailing edge of the plate. A pair of pins 43 are positioned in the drilled apertures and are threaded in place or otherwise anchored. These pins 43 are in a common plane through the axis of the cylinder, and are spaced apart a distance which is exactly equal to the distance between the notches 39 and in the plate 37, and the plate is positioned about the cylinder. As long as the notches are in engagement with the pins 43, the plates will be properly located on a cylinder.

Figures 10, 11:
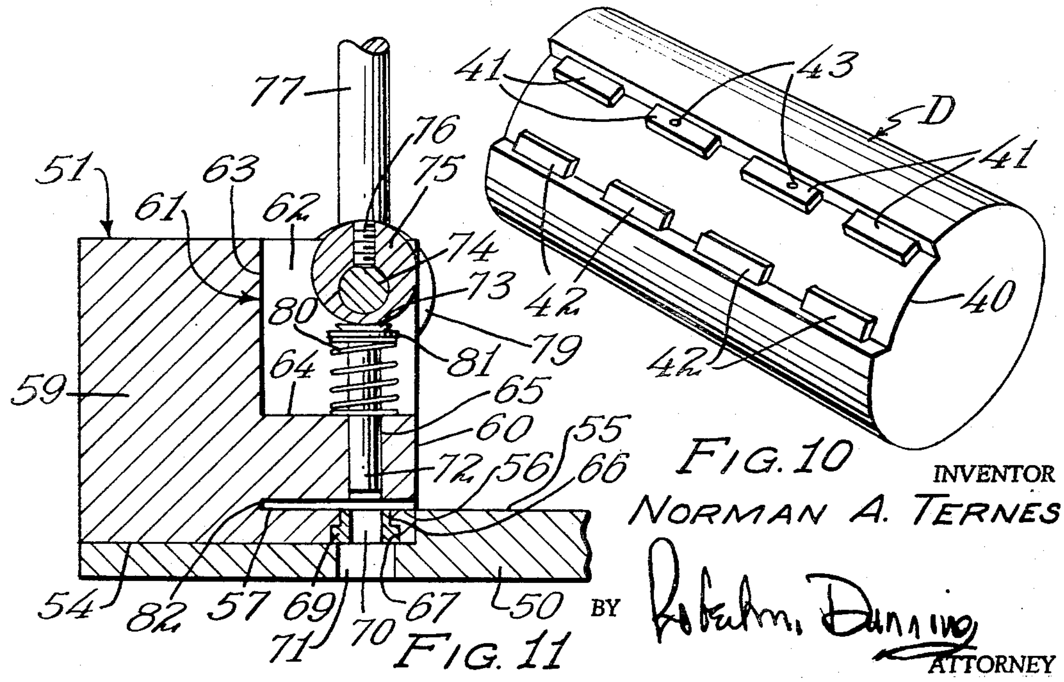
FIGURE 10 is a diagrammatic view of a finished cylinder showing a pin which is used in conjunction therewith.
FIGURE 11 is a vertical sectional view through a portion of the punch.

The apparatus which is used for perforating the masks and notching the plates is illustrated in FIGURES 8, 9, and 11 of the drawings. The device includes a base plate which is indicated in general by the numeral 50, and upon which are supported a series of punch elements which are of identical form. However, with reference to a centerline 53 which is shown in broken lines in FIGURE 8 of the drawings, the two punch elements 52 are centered a distance from the centerline 53 equalling fifteen inches. The outermost punch elements 51 are located from the centerline 53 a distance equal to thirty inches. Thus, the spacing between the centers of the individual punch units are a multiple of seven and one-half inches.

The punch units 51, 52 are recessed into notches 54 in an edge of the base plate 50 as is indicated in FIGURE 11 of the drawings, the upper surface 55 of the base plate 50 being flushed with the lower edge 56 in a notch 57 in the forward side of each of the punch units. The body 59 of each punch unit 51, or 52, is a generally rectangular block of metal which is generally square when viewed from the side, and generally rectangular when viewed from the front or back. For the purpose of reference, the forward side of each of the body blocks 59 is indicated by the numeral 60.

A substantially rectangular notch 61 is formed in the forward side 60 of each of the body blocks 59, the notch being generally rectangular and including parallel vertical side walls, one of which is indicated at 62, a vertical rear wall 63, and a horizontal bottom wall 64.

A vertical punch bore 65 extends through the bottom surface 64 on the notches 61 intersecting the notch 57. The under portion of the body block 59 below the lower surface 56 of the notch 57 is drilled to a larger diameter bore as indicated at 66, and the bore 66 communicates with an even larger counter bore 67 in the undersurface of the block 59. This arrangement is provided to accommodate a tubular female die 69 having an internal bore 70 identical to the bore 65 and which is aligned therewith. The base plate 50 is apertured as indicated at 71 in alignment with the aperture 70 through the die so that the punched out material may drop through the base plate.

The male portion of each punching die includes a cylindrical plunger 72 having an enlarged blunt end 73. A pivot shaft 74 extends across the punch element on an axis parallel to the surface of the base plate 50, the shaft 74 intersecting the walls of the blocks 59 on opposite sides of the notches 61. Cams or eccentrics 75 are secured to the shaft 74 by set screws 76, the cams or eccentrics fitting snugly between opposite sidewalls 62 of the notches 61. In the arrangement illustrated, the eccentrics 75 are positioned so that their outer surfaces are nearest to the axis of the shaft 74 immediately below the axis of the shaft 74, when the handle 77 is in vertical position. The handle 77 is attached to a collar 79 mounted at the center of the shaft 74 between the innermost punched members 52.

The upper end of each of the punched plungers 72 is held against the undersurface of the corresponding cam 75 by means of a spring 80 interposed between the base surface 64 of each notch 61 and a washer 81 beneath the enlarged plunger head 73. Thus, the plungers 72 are normally held in their raised and retracted positions. However, when the handle lever 77 is pivoted forwardly, the cams 75 force the punch plungers 72 downwardly through any element held within the notches 57.

From this explanation, it should be clear that when one of the masks which has been described, has its edge inserted in the various notches 57 of the punching units, and the edge of each such sheet is against the base 82 of each notch 57, the pivoting of the handle lever 77 will produce punched apertures in the edge of the mask which apertures are at a predetermined distance from the edge of the mask, and which apertures are spaced apart in multiple of seven and one-half inches. Normally, the apertures which are most greatly spaced are used for locating the various elements during the process. However, there is no particular disadvantage in punching more apertures than are actually used in practice.

The same punch which has been described may be also employed to punch the notches in the edges of the plates. This is accomplished by use of spacing arms 85 which are pivotally attached as indicated at 86 to a side wall of each of the body blocks 59. Each such spacing arm 85 is provided with a forward end 87 which is vertical when the angularly projecting end 89 of the arm is resting upon the upper surface of the base plate 50. The forward surfaces 87 of the various arms 85 are substantially on a vertical plane through the axes of the individual punch plungers 72 when they are in the position illustrated in full lines in FIGURE 9 of the drawings. When the arms 85 are not in use, they may be swung into the inoperative position shown in dotted outline in FIGURE 9 to engage against a stop pin 90 projecting from the body block.

During the operation of punching the apertures through the various individual masks, the edges of the mask are inserted into the notches 57, and against the rear ends 82 thereof. However, when the printing plates are punched, the arms 85 are swung downwardly into the position shown in FIGURE 9, and the edge of the printing plate to be notched is held against the ends 87 of these spacing arms. By punching the masks as well as the plates with the same punch, and by spacing the centers of the punches a distance equal to the spacing of the pins on the printing press, a constant means of control throughout the entire process is accomplished.

In the foregoing description, a specific method of forming printing plates has been described. In some instances, other methods have been used to accomplish similar results. For example, the use of the masks for supporting the photographic negatives may be eliminated under certain other types of photographic processes. However, the same method is applicable to all of the various systems, as some form of photographic transparency is normally used for producing the printing plates, and as the photographic transparencies which are used for this purpose can be properly punched so that all of the transparencies are in registry with the result that the plates are also in registry, relative to the notches in the edges thereof. When these notches are used to position the plates on the printing cylinder, the adjustment of the printing plates on the cylinders is virtually eliminated.

In accordance with the patent statutes, I have described the principles of construction and operation of my improvement for applying printing plates to printing presses, and while I have endeavored to set forth the best embodiment thereof, I desire to have it understood that changes may be made within the scope of the following claims without departing from the spirit of my invention.

I claim:

1. A process of printing in a plurality of colors on a printing press including a printing cylinder adapted to accommodate flexible printing plates and being provided with a pair of spaced pins arranged on a common plane extending diametrically through the cylinder and including the cylinder axis, the pins being spaced apart a distance which is a multiple of three and three-quarters inches, and through the use of a stripping table and an exposure table both equipped with a row of threaded apertures along an edge thereof spaced apart at intervals of three and three-quarters inches, the process including the steps of:

punching the art work to provide circular apertures at a predetermined distance from an edge thereof and at spaced points which are a distance apart equal to a multiple of three and three-quarters inches, and which are spaced similarly to the pins on the printing cylinder, forming a series of exposed photographic color negatives from the original art work, inserting pins in two of the apertures of said row of threaded apertures in said stripping table which are spaced apart a distance equal to the spacing of the pins of the printing cylinder, punching a masking sheet to provide circular apertures at said predetermined distance from an edge thereof and at spaced points spaced apart a distance equal to the openings in said art work, inserting the pins of said stripper table through the punched apertures in said art work and in said masking sheet, cutting openings in the masking sheet to expose areas of said art work which are of one color, attaching individual negatives over the openings in said masking sheet while the mask is so positioned over said art work while said negatives are aligned with the corresponding parts of said art work, punching a second masking sheet similarly to the first, and cutting apertures in the second masking sheet to expose areas of said art work of a second color, removing said first masking sheet and negatives secured thereto from said pins in said stripper table and substituting the second masking sheet in overlying relation to said art work, attaching individual negatives over the openings in said masking sheet while the second masking sheet is so positioned over the art work, inserting pins in two of the apertures of said row of apertures in said exposure table, said pins being spaced similarly to the pins on said printing cylinder, inserting the pins of said exposure table through the punched apertures in said first masking sheet having negatives attached thereto, notching the edge of a light sensitive printing plate to provide semicircular notches spaced apart a distance equal to the spacing of said circular apertures, holding semicircular notches of said printing plate against said pins of said exposure plate overlying said first masking sheet and exposing said printing plate to form a first color printing plate, forming a second color printing plate using said second masking sheet in a manner described for forming the first printing plate, sequentially clamping said color plates to said printing cylinder with said semicircular notches engaging said pins on said cylinder and sequentially printing sheets with different colored inks by said different plates.

2. A process of preparing printing plates for printing a plurality of colors on a printing press including a printing cylinder adapted to accommodate flexible printing plates and being provided with a pair of spaced pins arranged on a common plane extending diametrically through the cylinder and including the cylinder axis, the pins being spaced apart a distance which is a multiple of three and three-quarters inches, and through the use of a stripping table and an exposure table each having a row of pin-receiving apertures along an edge thereof spaced apart a distance which is a multiple of three and three-quarters inches, and through the use of a punch having a series of cylindrical punch plungers operable to punch circular apertures at a predetermined distance from an edge of the member being punched and operable to punch semicircular notches in said edge of the member being punched, punch plungers being spaced a distance of a multiple of three and three-quarters inches from one another, the method including:

punching the art work to provide a pair of circular apertures spaced a predetermined distance from an edge thereof and spaced apart a distance equal to the spacing of said pins on said cylinder, punching a masking sheet to provide a pair of circular apertures spaced said predetermined distance from an edge thereof and spaced apart a distance equal to the spacing of said pins of said cylinder, inserting pins in two of said pin receiving apertures on said stripping table which are spaced apart a distance equal to the spacing of said pins on said cylinder, placing the masking sheet overlying the art work with the punched apertures in the art work and in the masking sheet encircling the stripping table pins, cutting the masking sheet to expose the portion of the art work which is to be of one color, forming exposed photographic negatives of each color from the original art work, securing individual negatives spanning the openings in the masking sheet in register with the art work, similarly forming a masking sheet to which is secured the negatives of the art work which are to be printed in another color, inserting pins in two of the pin receiving apertures on said exposure table which are spaced apart a distance equal to the spacing of said pins on said cylinder, holding a light sensitive printing plate with an edge thereof aligned with the axes of two cylindrical punch plungers of said punch and punching two spaced semicircular notches in said plate edge which are spaced apart a distance equal to the spacing of said pins on said cylinder, placing the first masking sheet and negatives secured thereto on said exposure table with the apertures thereof encircling said pins, superimposing the printing plate on said film with the semicircular notches embracing the pins of said exposure table and exposing the plate, repeating the step of notching the edge of a light sensitive printing plate with a second light sensitive printing plate, placing the second masking sheet with the second color negatives thereon, on said exposure table with the apertures thereof encircling said pins, superimposing the second light sensitive plate on said second masking sheet with the semicircular notches embracing the pins of said exposure table and exposing the second plate.

References Cited

UNITED STATES PATENTS

| | | | |
|---|---|---|---|
| 2,579,517 | 12/1951 | Rowell et al. | 101—415.1 |
| 2,621,592 | 12/1952 | Faeber | 101—415.1 |
| 2,937,593 | 5/1966 | Ritzerfeld et al. | 101—415.1 |
| 3,160,096 | 12/1964 | Norton | 101—401.1 |
| 2,099,364 | 11/1937 | Hunter. | |

OTHER REFERENCES

Continuous Control of Register, published 1959, by the Chesley F. Carlson Co., Minneapolis, Minn.

DAVID KLEIN, *Primary Examiner.*